(12) United States Patent
Moledina et al.

(10) Patent No.: US 6,188,797 B1
(45) Date of Patent: Feb. 13, 2001

(54) DECODER FOR PROGRAMMABLE VARIABLE LENGTH DATA

(75) Inventors: Riaz A. Moledina, Woodside; Heng-Mun Lam, Cupertino; Stuart L. Claasen, Santa Clara, all of CA (US)

(73) Assignee: Apple Computer, Inc., Cupertino, CA (US)

(*) Notice: Under 35 U.S.C. 154(b), the term of this patent shall be extended for 0 days.

(21) Appl. No.: 08/775,132

(22) Filed: May 27, 1997

(51) Int. Cl.[7] ........................................... G06K 9/36
(52) U.S. Cl. ..................... 382/246; 382/244; 358/427; 341/67
(58) Field of Search ................... 382/244–246, 382/232; 341/65, 67, 59; 358/427, 261.1

(56) References Cited

U.S. PATENT DOCUMENTS

| | | | |
|---|---|---|---|
| 5,398,027 | * 3/1995 | Ooi | 341/67 |
| 5,696,507 | * 12/1999 | Nam | 341/67 |
| 5,793,896 | * 8/1998 | Golin | 382/246 |
| 5,835,035 | * 11/1998 | Bakhmutsky | 341/67 |
| 5,982,306 | * 11/1999 | Nam | 341/67 |
| 5,991,451 | * 11/1999 | Keith et al. | 382/246 |

* cited by examiner

Primary Examiner—Leo H. Boudreau
Assistant Examiner—Ishrat Sherali
(74) Attorney, Agent, or Firm—Burns, Doane, Swecker & Mathis, L.L.P.

(57) ABSTRACT

An improved binary tree and decoder are disclosed wherein all the codewords are moved to one side of a binary tree. A compressed bit stream is fed to a decoder. The decoder uses a parser, an address generator, and the binary tree to determine the codewords contained in the compressed bit stream. The decoder examines the variable length encoded bits and compares them with the binary tree at each level to determine if the codeword is complete. The parser detects the end of the codeword and generates an offset for the address generator. The address generator uses the binary tree and offset to generate a block address for each unique codeword. The block address is then used to output uncompressed data from a pattern look up table.

9 Claims, 3 Drawing Sheets

DECODER FOR PROGRAMMABLE VARIABLE LENGTH DATA

BACKGROUND

The present invention relates generally to data compression, and more specifically to the decoding of programmable variable length encoded data.

As digital communication replaces traditional forms of analog communication, the need for improved digital communication continually grows. One method of improving the efficiency of digital communication can be achieved through use of data compression, namely the reduction in the amount of signal space that must be allocated to a given message set or data sample set. Reduction of signal space allows, among other things, the use of smaller memories and increased transmission rates. By reducing the amount of needed signal space, therefore, system performance of a digital communication/storage system can be improved and overall system cost can be reduced.

Generally speaking, data compression involves the assignment of unique codewords to a block of data to be transmitted and/or stored in memory. In a simple form of data compression, each codeword might have a fixed number of bits. For example, each character in a typical document might be described with a 5 or 6-bit codeword, instead of a 7-bit ASCII representation. While this type of encoding reduces the total amount of data, it is unlikely to compress the data to an optimum degree.

To provide greater compression of data, a different encoding technique known as run-length encoding, or variable-length encoding (VLE), is more commonly employed. One well-known example of VLE is Huffman encoding. VLE is based upon statistical information about the data to be compressed. The data is encoded using fewer bits to specify commonly-occurring input data samples, and using more bits to specify less frequently-occurring samples. For example, to accomplish the compression of text data, an encoding scheme can use a codeword having a few bits to specify commonly-occurring letters of the alphabet, such as "E", while using codewords with more bits to specify rarely used letters, such as, "Q" or "X". By using a variable number of bits to encode input data, fewer bits are needed overall than if a fixed number of bits are used to specify each letter.

To decompress the data, of course, the mapping between the codewords and the data must be provided to a decoder. Typically, the mapping between data and codewords is defined in the form of a binary coding tree. A binary coding tree is made up of a root and nodes, each having two branches, where none, either, or both, of each node's branches may end with a completed codeword (or leaf). Such a tree can be described using two bits for each node. Therefore, if N bits are needed to describe a pattern-to-codeword mapping, $(2+4+8 \ldots +2^N)$ bits will be needed to describe the tree to a decoder. For example, if 16 bits are used for each codeword, the binary coding tree would have to be 16 levels deep and would require 131,070 bits to describe the tree. A 32-level tree would require 8,589,934,590 bits to describe. Therefore, if the binary coding tree must be provided to the decoder each time new data is to be compressed, it becomes very expensive and/or time consuming to decode the codewords.

It is possible, of course, to use a fixed coding tree for all data to be compressed, and thereby avoid the need to describe the tree to the decoder whenever data is to be decoded. For example, the coding tree for a Huffman encoder/decoder is fixed. However, the use of the same data-to-codeword mapping may not provide optimal compression in all cases. For example, in one document, the letter "E" may be used most frequently, in which case an optimal data-to-codeword mapping would employ a single bit to represent that letter. In another document, however, the letter "A" may be the most prominent, in which case the same mapping would not provide optimal compression.

It is preferable, therefore, to be able to vary the coding tree to provide better compression for different instances of data. By analyzing the data prior to compression, statistical information can be obtained regarding the frequency with which each item of data occurs, and an optimal data-to-codeword mapping can be employed. If the statistical information does not vary much between different instances, it might be possible to predefine a small number of fixed mappings, and select the one which is most appropriate for the set of data to be encoded. In such a case, the binary coding trees can be stored in the decoder, and the correct one selected each time data is to be decompressed. With this approach, it is not necessary to transmit a description of the binary coding tree to the decoder for each new set of data.

This type of approach is not optimal for the compression of data which can have large degrees of variation from one instance to the next, for example image data. In that situation, it is preferable to employ programmable variable length encoding, rather than a fixed VLE, to provide the best compression for a given set of data. In programmable VLE, statistical information for the data is obtained, and a data-to-codeword mapping is then created to provide the greatest amount of compression. Heretofore, however, programmable VLE has not been employed because it requires the binary coding tree to be described to the decoder for each new set of data, resulting in the problem described previously.

It is an object of the present invention to provide a mapping scheme for decoding compressed data that minimizes the number of bits needed to describe the data-to-codeword mapping without losing any compression ability. It is a further object of the invention to provide a programmable variable length approach to data compression.

SUMMARY

The present invention is based on the principle that the actual codewords that are used to describe an item of data are not critical, as long as they are unique for each item of data to be represented. Under this approach, all of the codewords can be moved to the right (or left) node of the binary tree. In such a case, only the number of nodes at each level of the tree which have no children need to be specified in order to completely define the tree, thereby significantly reducing the amount of data that must be provided to the decoder. For instance, in the previous example given above of N bits, only $(1+2+3+4 \ldots N)$ bits are required to describe the tree according to the present invention. For the 16- and 32-bit deep trees, only 136 and 528 bits are needed, respectively.

In the operation of a decoder according to the present invention, a compressed data stream is fed into the decoder. The decoder parses the variable length codewords contained in the compressed bit stream and examines one bit at a time. With each bit in the stream, the decoder moves down the binary tree one level. At each level, the decoder determines if the codeword is complete. Once such a determination is made, a unique address is generated for the completed codeword. The address is used in a look-up table to identify the decompressed data to which the codeword relates.

The foregoing features of the invention, as well as the advantages attained thereby, are described in detail with reference to an embodiment illustrated in the accompanying drawings.

BRIEF DESCRIPTION OF THE DRAWINGS

The features and advantages of the invention will be understood by reading the following description in conjunction with the drawings, in which.

DETAILED DESCRIPTION

Figure 1:
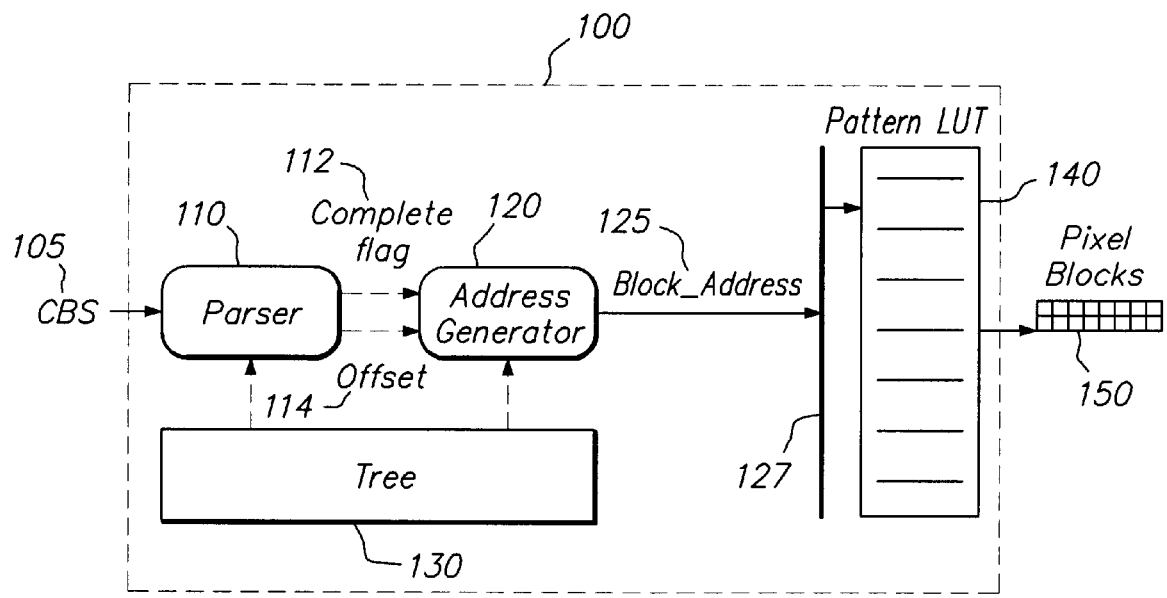
FIG. 1 is an exemplary decoder of a type in which to the present invention can be implemented.

The various features of the invention will now be described with respect to an embodiment illustrated in the figures, in which like parts are identified with the same reference characters.

In order to reduce the amount of signal space that must be allocated to a given data sample set, various data compression techniques can be used. In variable length coding schemes, such as Huffman coding, the data set is sampled, analyzed, and then encoded into a compressed bit stream (CBS). After the CBS is stored or transmitted, the CBS must be decoded when the data is to be utilized. The decoder expands the CBS into the original data set, while attempting to minimize any potential loss of information.

THE DECODER

According to an exemplary embodiment of the present invention, shown in FIG. 1, a decoder 100 can be a special purpose, hard-wired machine that decodes a compressed bit stream (CBS) 105 into pixel blocks 150, for example to be printed or displayed. Although the CBS 105 is described as representing pixel data for an image, it will be appreciated by those skilled in the art that the inventive concepts described herein are equally applicable to other types of encoded data, for example, compressed text files. The decoding is accomplished through use of a binary tree 130 and a pattern look-up table (LUT) 140.

Conceptually, the decoder 100 comprises three modules, a parser 110, an address generator 120, and a pattern LUT 140. The parser 110 parses the CBS 105 into its constituent variable length codewords using the binary tree 130 generated by the encoder (not shown). Each time the parser 110 detects the end of a codeword, it asserts a complete flag 112 and passes an offset 114 to the address generator 120.

The address generator 120 uses the tree 130 and the offset 114 to generate a Block Address 125 for each codeword. When the parser indicates that the codeword is complete, the address generator 120 outputs the Block Address 125 of the codeword to the pattern LUT 140. The information stored at the designated address of the LUT represents a particular pattern of pixels, which is read as the output signal 150.

BINARY TREES

Figure 2:
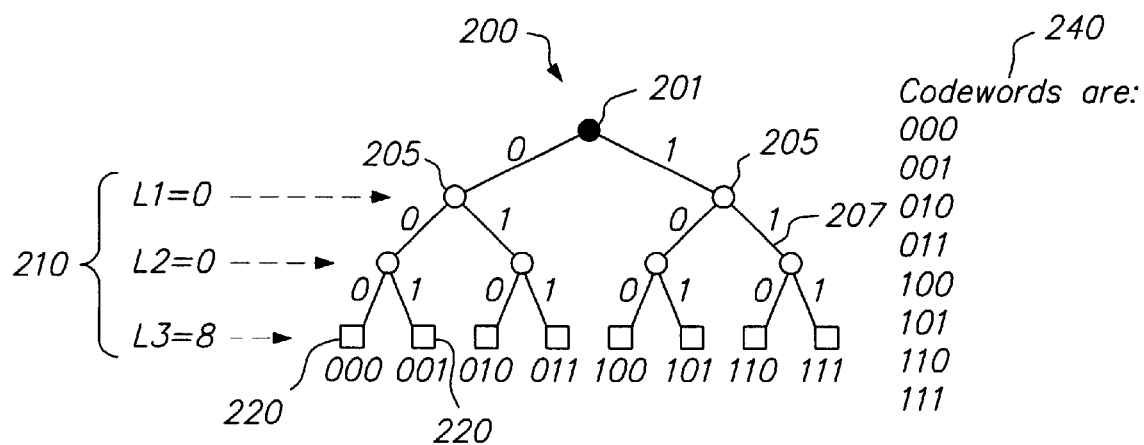
FIG. 2 is an example of a fixed depth binary tree.

As previously mentioned, one way to represent codewords is through the use of a binary tree. FIG. 2 is an example of a fixed depth binary tree. A binary tree 200 is made up of nodes 205, each having two branches 207 which respectively correspond to the binary digits zero and one. In the illustrated example, the left branch represents binary zero, and the right branch represents binary one. Any sequence of bits, e.g. a codeword 240, can be represented by a leaf 220 of a binary tree. For any given codeword 240, the tree can be traversed by starting at the root node 201 and travelling through the nodes 205 and branches 207 corresponding to the codeword until the leaf for the codeword is reached. At this leaf, the tree is pruned, i.e. it has no further branches. If a unique address can be deduced for each leaf in a tree, the unique address can be used to look up an encoded pixel pattern corresponding to the codeword. In FIG. 2, a binary tree is represented with eight leaves 220, corresponding to codewords 240, all at the third level (L3) down from the root node 201. Therefore, for this example, all the codewords consist of three bits, i.e., fixed length encoding is employed. Level content numbers 210 signify how many leaves 220 are at any particular level of the tree. In this case, the codewords 240 can be used as unique addresses (0 through 7).

Figure 3:
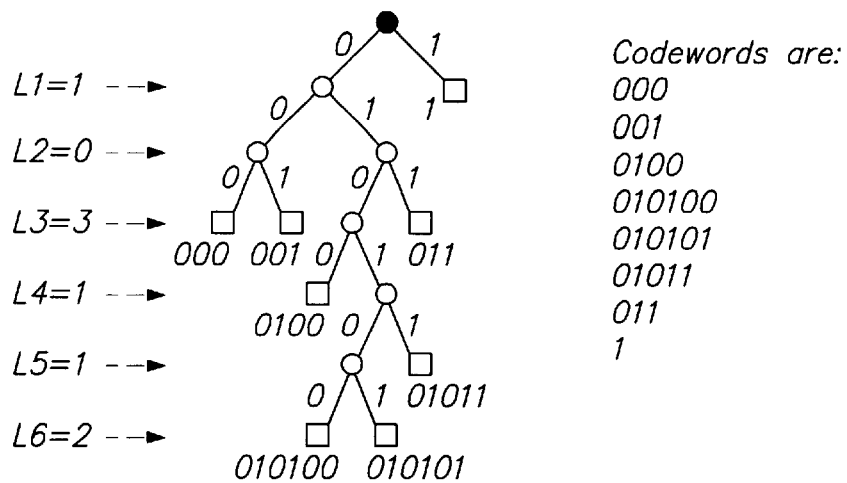
FIG. 3 is an example of a variable depth binary tree.

Unfortunately, fixed depth or balanced trees as shown in FIG. 2 are not useful for compression of variable length codewords where the codewords, or leaves, are not all on the same level. Compression using variable length codewords allows a codeword consisting of a few bits to represent commonly occurring patterns while using more bits for codewords that represent patterns that do not occur very often in the data. Due to the varying number of bits needed for any one codeword, the codewords will end at varying depths of the binary tree. An example of a variable depth binary tree is shown in FIG. 3.

In this example, there are also eight codewords, as in the example of FIG. 2. However, in the binary tree of FIG. 3, there is one codeword at L1 (Level 1), 0 at L2, 3 at L3, 1 at L4, one at L5, and 2 at L6. Of course, one skilled in the art will appreciate that there are many different possible binary trees with eight codewords, FIG. 3 being an example of one of them. Thus, for a given number of codewords, the tree could have an arbitrary length and shape. As discussed previously, one disadvantage of using an arbitrary variable length binary tree is that many bits are needed to describe the tree. For instance, if the tree is restricted to a depth of 15 levels, and the total number of codewords to 1024, then the number of bits needed to describe such a tree is $[2*(2^1+2^2+2^3+2^4+2^5+2^6+2^7+2^8+2^9+2^{10}+2^{10}+2^{10}+2^{10}+2^{10}+2^{10})]=14K$ bits, or 140K gates in a hardware implementation. The use of a decoder based on such a tree would be cost prohibitive.

Figure 4:
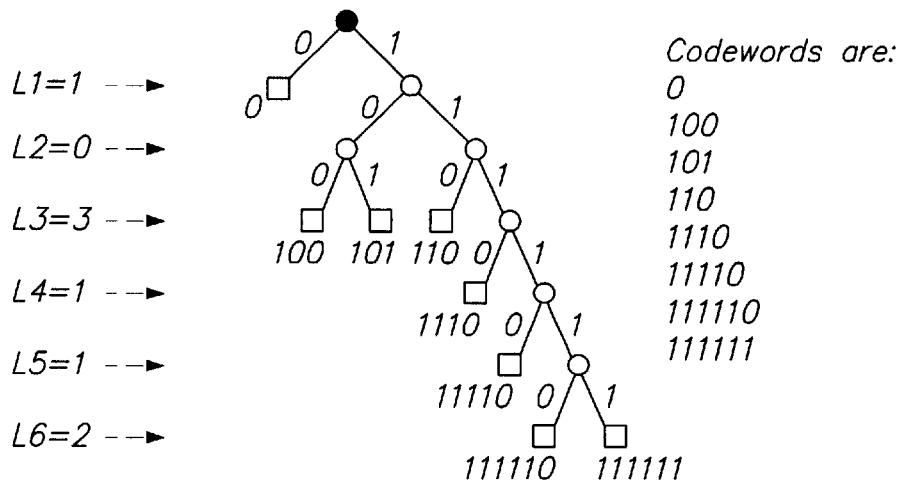
FIG. 4 depicts a left pruned binary tree.

According to one embodiment of the compression/decompression technique of the present invention, an arbitrary binary tree is not required. Rather, it is only necessary that the encoder be able to encode a pattern with a certain number of bits. The specific bits which are used to describe a codeword are not important, as long as the bits form a unique sequence. Therefore, according to one aspect of the present invention, the encoding/decoding tree is pruned to one side, e.g., the left side, without loss of fidelity. In essence, in a binary tree which is left-pruned, all of the leaves appear on the left branches of nodes for levels having a codeword, and connections to lower levels occur via the right branch of a node. If a node does not connect to a lower level, both of the branches end in leaves. An example of such a tree is shown in FIG. 4. Note that in the examples of both FIG. 3 and FIG. 4, the number of leaves at any particular level (L1, L2 . . . L6) is the same. When the tree is pruned to one side in this manner, the level content numbers Lx are sufficient to uniquely describe the binary tree. A 15-level tree as described above, which is left-pruned, can be fully described with 2+3+4+5+6+7+8+9+10+11+11+11+11+11+11+11 bits, which equals 120 bits. This is a substantial improvement over the 14K bits needed for the arbitrary binary tree of 15 levels described previously.

THE PARSER

In an exemplary embodiment of the invention, the parser 110 reads a compressed bit stream CBS 105 one bit at a time, traversing the binary tree as defined by the level content numbers Lx, one level at a time. The parser continues to read the bits until the parser finds that the codeword is complete, as described hereinafter. When the parser finds a completed codeword, it signals the address generator 120. The address generator locates an address corresponding to the codeword and presents that codeword's address to the pattern LUT 140. The parser then begins parsing the next codeword, starting again at the root of the tree.

It is significant to note that the left-pruned binary tree has the characteristic that the decoding process terminates when the level count of the tree, expressed in binary form, exceeds the binary count of the codeword. In other words, the codeword is complete at level x when:

$$(L1*2^{x-1})+(L2*2^{x-2})\ldots+(Lx*2^0)>(B1*2^{x-1})+(B2*2^{x-2})\ldots+(Bx*2^0) \quad \text{(Equation 1)}$$

where B1, B2 . . . Bx are successive bits of a codeword read from the CBS.

The difference between the binary count of the codeword and the level count of the tree is labelled an offset. Hence, the codeword is complete when the offset is negative, i.e.:

$$\text{Offset}=(B1-L1)*2^{x-1}+(B2-L2)*2^{x-2}\ldots+(Bx-Lx)*2^0<0 \quad \text{(Equation 2)}$$

At any level x of the binary tree, when the codeword is complete, the offset will return a negative integer between negative 1 and negative y, where y=Lx.

THE ADDRESS GENERATOR

Figure 5:
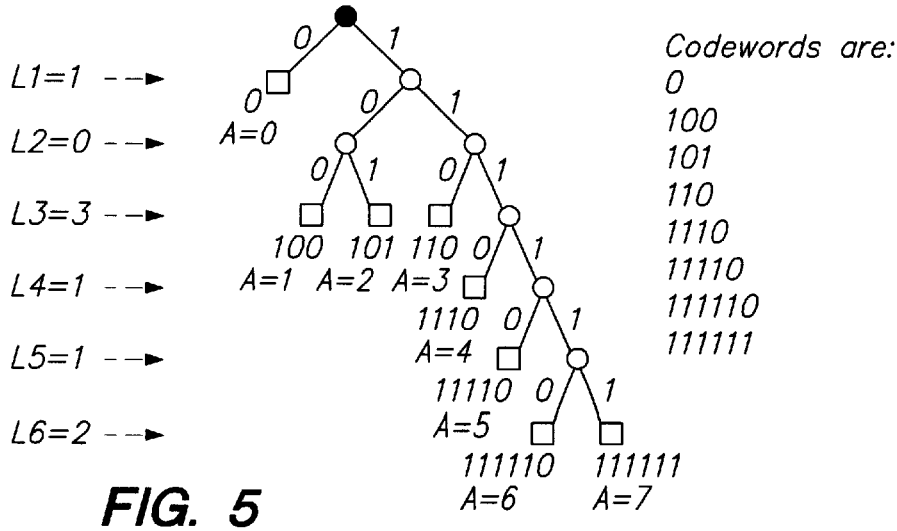
FIG. 5 is the tree shown in FIG. 4 above with unique block addresses.

The address generator identifies each codeword with a unique block address. When the parser detects that the current codeword is complete, the address generator presents the block address associated with that codeword to the pattern look-up table FIG. 5 shows the same tree as above in FIG. 4, wherein a unique block address is associated with each codeword. The addressing comprises a simple numbering scheme starting from "A=0", and incrementing as leaves are identified top to bottom, left to right. This numbering pattern can be generated by summing up all the level content numbers from L1 down to Lx, where a codeword completes, and adding the negative offset generated by the parser or, in other words:

$$\text{Block\_address}=L1+L2+\ldots+Lx+\text{offset} \quad \text{(Equation 3)}$$

DECODER IMPLEMENTATION

Figure 6:
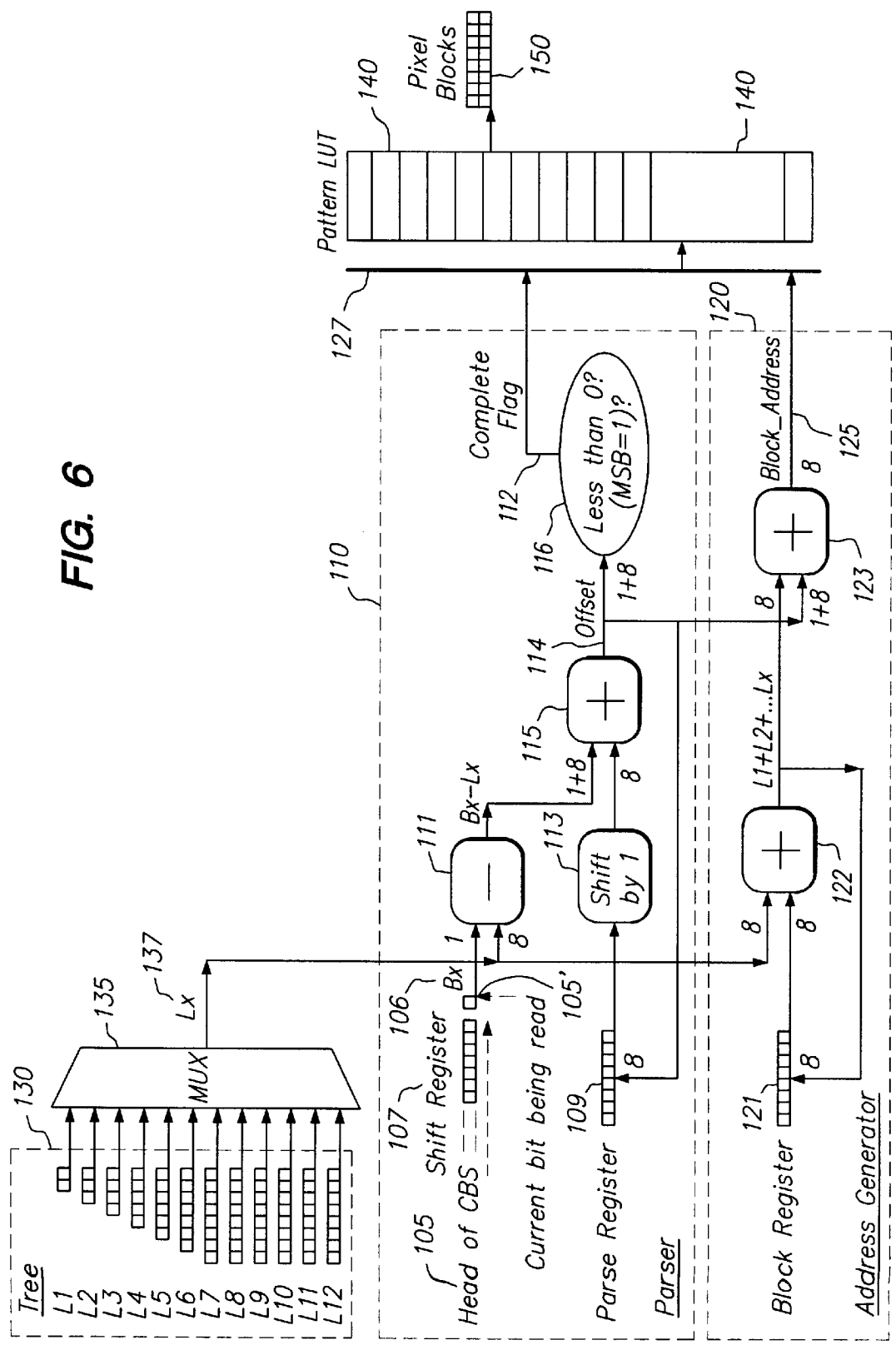
FIG. 6 is an exemplary block diagram of a decoder implementation according to the present invention.

Turning to FIG. 6, which shows an exemplary embodiment of the decoder implementation, the parser 110 reads the CBS 105 one bit at a time, calculating the offset at every clock cycle, pursuant to Equation 2. The compressed bit stream 105 is read into a shift register 107. The current bit being read, Bx, is input into a subtractor 111 along with the appropriate level content number Lx read from tree 130 via a MUX 135, to calculate the value Bx−Lx. The contents of a parse register 109 are shifted by one at 113 and added by adder 115 to the output of the subtractor 111 to produce the offset 114. The result is the equivalent of Equation 2 given above. The parse register 109 holds the previous offset value. Meanwhile the output Lx from the MUX 135 is input into adder 122 along with the contents of a block register 121 which holds the summation of the L values for all of the bits in the current codeword. This is combined along with the offset 114 by adder 123 to produce a block address 125. Comparator 116 checks to see when the offset 114 is negative (i.e. the most significant bit equals one) indicating that the codeword is complete. If the offset 114 is negative, a complete flag 112 is sent to a bus 127 which allows the block address 125 to be read by the pattern LUT 140 to generate the corresponding pixel blocks 150 associated with the decoded codeword.

From the foregoing it can be seen that the present invention provides an encoding/decoding technique which permits a programmable variable length coding tree to be employed in a practical manner, to thereby achieve optimal compression for any data stream. By pruning the coding tree to one side, the tree can be succinctly described by the number of leaves at each level. Using such a tree, an encoded data stream is parsed by detecting when each codeword is complete, and generating a unique address associated with the codeword. The unique address is then used to look up the decoded data.

The present invention has been described by way of example, and modifications and variations of the exemplary embodiments will suggest themselves to skilled artisans in this field without departing from the spirit of the invention. For instance, the techniques of the invention can be applied to any type of data stream. The decoding process can be implemented in software, in lieu of the hardware implementation shown in FIG. 6. Further in this regard, the encoded data need not be examined one bit at a time. By connecting multiple parsers of the type shown in FIG. 6 in parallel with one another, the decoder can examine bits in parallel, rather than serially as described.

The preferred embodiments described herein are therefore merely illustrative and should not be considered restrictive in any way. The scope of the invention is to be measured by the appended claims, rather than the preceding description, and all variations and equivalents which are encompassed within the range of the claims are intended to be embraced therein.

What is claimed is:

1. A method for decoding variable length encoded data comprising the steps of:
    reading a compressed bit stream of data;
    parsing the stream of compressed bit data into variable length codewords using a multi-level binary coding tree which is pruned to one side, wherein each level of the pruned binary tree has an associated level content number that equals the number of leaves on that level of the tree, and wherein the step of parsing the stream of data comprises the steps of:
        comparing the binary value of bits in the data stream to the value of a corresponding number of level content numbers for the binary tree;
        detecting when the value of the level content numbers is greater than the binary value of the bits in the data stream; and
        provinding an indication that the codeword is complete upon such detection;
    generating an address to a look-up table for each codeword; and outputting decoded data from the look-up table corresponding to the variable length codewords.

2. The method according to claim according to claim 1 wherein the level content numbers uniquely describe the pruned binary tree.

3. The method of claim 1 wherein the step of generating an address comprises the steps of:
subtracting the value of the level content numbers from the binary value of the codeword to generate an offset value;
adding said offset value to a sum of the level content numbers.

4. An improved decoder for decoding variable length encoded data comprising:
a binary tree coding having branches which are pruned to one side for representing codewords;
a parser for parsing a compressed bit stream of encoded data into variable length codewords using the pruned binary tree and generating an address for each codeword in the compressed bit stream wherein each level of the pruned binary tree has a level content number that equals the number of leaves on that level of the tree and wherein said parser compares the binary value of bits in the encoded data to the value of a corresponding number of level content numbers for the binary tree. and identifies a codeword as being complete when the value of the level content numbers exceeds the binary value of the bits; and
a pattern look-up table for outputting stored data corresponding to the generated address.

5. A decoder according to claim 4 wherein the level numbers uniquely describe the binary tree.

6. The decoder of claim 4 wherein said parser generates an offset value based on the difference between the value of the level content numbers and the binary value of the bits, and further including an address generator for adding said offset value to the sum of the level content numbers to generate said address.

7. A method for decoding variable length encoded data comprising the steps of:
reading a compressed bit stream of data;
parsing the stream of compressed bit data into variable length codewords using a multi-level binary coding tree which is pruned to one side, wherein each level of the pruned binary tree has an associated level content number that equals the number of leaves on that level of the tree, and wherein said step of parsing the stream of data comprises the steps of:
comparing the binary value of bits in the data stream to the value of a corresponding number of level content numbers for the binary tree;
detecting when the value of the level content numbers is greater than the binary value of the bits in the data stream;
providing an indication that the codeword is complete upon such detection; and
generating an offset value;
generating an address;
receiving the address generated at said step of generating by a pattern look-up table; and
outputting decoded data from the pattern look-up table corresponding to the variable length codewords.

8. A method for decoding variable length encoded data comprising the steps of:
reading a compressed bit stream of data;
parsing the stream of compressed bit data into variable length codewords using a multi-level binary coding tree which is pruned to one side, wherein each level of the pruned binary tree has an associated level content number that equals the number of leaves on that level of the tree;
generating an address to a look-up table for each codeword, wherein said step of generating an address comprises:
subtracting the value of the level content numbers from the binary value of the codeword to generate an offset value; and
adding said offset value to a sum of the level content numbers; and
outputting decoded data from the look-up table corresponding to the variable length codewords.

9. An improved decoder for decoding variable length encoded data comprising:
a binary tree coding having branches which are pruned to one side for representing codewords;
a parser for parsing a compressed bit stream of encoded data into variable length codewords using the pruned binary tree and generating an address for each codeword in the compressed bit stream wherein each level of the pruned binary tree has a level content number that equals the number of leaves on that level of the tree, wherein said parser generates an offset value based on the difference between the value of the level content numbers and the binary value of the bits, and further including an address generator for adding said offset value to the sum of the level content numbers to generate said address; and
a pattern look-up table for outputting stored data corresponding to the generated address.

* * * * *

UNITED STATES PATENT AND TRADEMARK OFFICE
CERTIFICATE OF CORRECTION

PATENT NO.   : 6,188,797 B1
DATED        : February 13, 2001
INVENTOR(S)  : Riaz A. Moledina et al.

It is certified that error appears in the above-identified patent and that said Letters Patent is hereby corrected as shown below:

<u>Title page,</u>
Please change the third inventor's last name from "Claasen," to -- Claassen --; and <u>Column 6, claim 1,</u>
Line 64, please change "provinding" to -- providing --.

Signed and Sealed this

Eleventh Day of December, 2001

*Attest:*

*Nicholas P. Godici*

NICHOLAS P. GODICI
*Acting Director of the United States Patent and Trademark Office*

*Attesting Officer*